(12) United States Patent
Appel et al.

(10) Patent No.: US 11,438,345 B2
(45) Date of Patent: Sep. 6, 2022

(54) SYSTEM AND METHOD FOR CONNECTED VEHICLE CYBERSECURITY

(71) Applicant: Upstream Security, Ltd., Herzliya (IL)

(72) Inventors: Yonatan Appel, Ramat Hasharon (IL); Yoav Levy, Kfar-Vitkin (IL)

(73) Assignee: Upstream Security, Ltd., Herzliya (IL)

(*) Notice: Subject to any disclaimer, the term of this patent is extended or adjusted under 35 U.S.C. 154(b) by 59 days.

(21) Appl. No.: 16/047,444

(22) Filed: Jul. 27, 2018

(65) Prior Publication Data

US 2019/0036948 A1 Jan. 31, 2019

Related U.S. Application Data

(60) Provisional application No. 62/537,608, filed on Jul. 27, 2017.

(51) Int. Cl.
*H04L 9/40* (2022.01)
*G06N 20/00* (2019.01)
*H04W 4/44* (2018.01)

(52) U.S. Cl.
CPC ......... *H04L 63/1416* (2013.01); *G06N 20/00* (2019.01); *H04L 63/1441* (2013.01); *H04L 63/20* (2013.01); *H04W 4/44* (2018.02)

(58) Field of Classification Search
CPC . H04L 63/1416; H04L 63/1441; H04L 63/20; G06N 20/00; H04W 4/44
USPC .......................................................... 726/23
See application file for complete search history.

(56) References Cited

U.S. PATENT DOCUMENTS

| | | | |
|---|---|---|---|
| 8,903,593 B1 | 12/2014 | Addepalli et al. | |
| 9,609,456 B2* | 3/2017 | Valencia | H04M 3/00 |
| 9,805,601 B1* | 10/2017 | Fields | B60T 17/22 |
| 10,028,147 B1* | 7/2018 | Coney | H04W 4/021 |

(Continued)

FOREIGN PATENT DOCUMENTS

| | | |
|---|---|---|
| EP | 3393086 A1 | 10/2018 |
| JP | 2017111796 A | 6/2017 |

OTHER PUBLICATIONS

A Machine Learning Approach for Fault Detection in Vehicular Cyber-Physical Systems Arman Sargolzaei, Carl D. Crane, III, Alireza Abbaspour, Shirin Noei 15th IEEE International Conference on Machine Learning and Applications pp. 636-640 (Year: 2016).*

(Continued)

*Primary Examiner* — Khalil Naghdali
(74) *Attorney, Agent, or Firm* — M&B IP Analysts, LLC

(57) ABSTRACT

A system and method for connected vehicle cybersecurity. The method includes creating a normal behavior model based on a first set of data, the first set of data including at least one first event with respect to at least one connected vehicle, wherein the first set of data is collected from a plurality of data sources; detecting an anomaly based on the normal behavior model and a second set of data, the second set of data including a second event with respect to the at least one connected vehicle, wherein each of the first set of data and the second set of data includes vehicle data related to operation of the at least one connected vehicle, wherein each event represents a communication with the at least one connected vehicle; determining, based on the detected anomaly, at least one mitigation action; and causing implementation of the at least one mitigation action.

35 Claims, 5 Drawing Sheets

(56) References Cited

U.S. PATENT DOCUMENTS

| | | | |
|---|---|---|---|
| 10,214,164 B2* | 2/2019 | Ben Noon | H04L 67/12 |
| 2012/0304007 A1* | 11/2012 | Hanks | G05B 23/0216 |
| | | | 714/26 |
| 2013/0060524 A1 | 3/2013 | Liao | |
| 2013/0227648 A1* | 8/2013 | Ricci | G06F 21/85 |
| | | | 726/3 |
| 2013/0290043 A1* | 10/2013 | Hoque | G06Q 10/02 |
| | | | 705/5 |
| 2015/0113638 A1* | 4/2015 | Valasek | H04L 63/1441 |
| | | | 726/22 |
| 2015/0150124 A1* | 5/2015 | Zhang | H04L 63/1408 |
| | | | 726/22 |
| 2015/0191135 A1* | 7/2015 | Ben Noon | H04L 63/1408 |
| | | | 726/22 |
| 2016/0036558 A1* | 2/2016 | Ibrahim | G08G 1/0112 |
| | | | 455/297 |
| 2017/0200323 A1* | 7/2017 | Allouche | G07C 5/0808 |
| 2017/0230385 A1* | 8/2017 | Ruvio | H04L 63/1416 |
| 2017/0318034 A1* | 11/2017 | Holland | H04L 63/1416 |
| 2017/0341605 A1* | 11/2017 | Ben Noon | H04L 63/0227 |
| 2018/0097637 A1* | 4/2018 | Weinfield | H04B 17/318 |
| 2018/0205754 A1* | 7/2018 | North | H04L 63/1433 |
| 2018/0262466 A1* | 9/2018 | Atad | H04W 76/12 |
| 2018/0300477 A1* | 10/2018 | Galula | H04L 63/1441 |
| 2018/0337938 A1* | 11/2018 | Kneib | H04L 12/40 |
| 2018/0351980 A1* | 12/2018 | Galula | H04L 63/1416 |
| 2018/0357870 A1* | 12/2018 | Siminoff | G08B 13/19606 |
| 2019/0036630 A1* | 1/2019 | Svennebring | H04W 40/12 |
| 2019/0101924 A1* | 4/2019 | Styler | B60W 30/0956 |
| 2019/0104108 A1* | 4/2019 | Rhee | H04L 63/0209 |
| 2020/0015075 A1* | 1/2020 | Takatsuka | H04L 12/28 |
| 2020/0396238 A1* | 12/2020 | Haga | H04W 4/40 |

OTHER PUBLICATIONS

Rieke et al., 2017 25th Euromicro International Conference on Parallel, Distributed and Network-Based Processing, "Behavior Analysis for Safety and Security in Automotive Systems", pp. 381-385 (Year: 2017).*

International Search Report and Written Opinion of International Searching Authority for PCT/US2018/044072, ISA/RU, Moscow, Russia, dated Dec. 10, 2018.

A Partial Supplementary European Search Report for European Patent Application No. 18838484.6, dated Feb. 16, 2021, EPO, Munich, Germany.

* cited by examiner

SYSTEM AND METHOD FOR CONNECTED VEHICLE CYBERSECURITY

CROSS-REFERENCE TO RELATED APPLICATIONS

This application claims the benefit of U.S. Provisional Patent Application No. 62/537,608 filed on Jul. 27, 2017, now pending, the contents of which are hereby incorporated by reference.

TECHNICAL FIELD

The present disclosure relates generally to connected and autonomous vehicles, and more specifically to cyber security of connected and autonomous vehicles and fleets.

BACKGROUND

With advances in computer technology, computerized navigation and control systems in vehicles have been created to improve drivers' experiences and to allow for remotely controlled transportation of people and goods. These computerized car systems can provide guided or assisted driving, or autonomously control vehicles. To this end, computerized driving systems may have access to and control over critical vehicle functions such as, for example, unlocking the car, turning the engine on and off, controlling steering and braking, and the like. To aid in navigation and control, connected vehicles may be equipped with network access that allows the connected vehicles to communicate with each other and/or with remote control systems. These connected vehicles may be used for, e.g., tracking commercial cars (for example, buses, trucks, delivery/rental vehicles), navigating self-driving or assisted driving cars, car sharing services, and the like. Gartner, Inc., forecasts that, by 2020, there will be at least 220 million connected cars on the road.

While connected vehicles offer great opportunities for owners of vehicles, these systems leave vehicles and the services that interact with those vehicles exposed to new dangers. Specifically, hackers can interfere with vehicle functions. Further, connected vehicles may be interfered with remotely. This opens the door to vehicle failure, theft, and other malicious activity, which can lead to death, injury, and financial damage due to, for example, loss of property, brand damage, recalls, law suits, etc. For example, a cyber attacker may be able to control driving systems, lock and unlock the car, turn the engine on or off, and the like. Additionally, due to the advent of controlled vehicle fleets, widespread cyber-attacks may be conducted on fleets including large numbers of cars simultaneously, enabling malicious actors to cause harm on a larger scale. Additionally, there is a concern regarding privacy for connected vehicles, as data leakage may also be harmful to vehicle owners.

It would therefore be advantageous to provide a solution that would overcome the challenges noted above by securing vehicles and connected car service layers against cyber threats. It would be further advantageous to provide a solution for securing fleets of vehicles against cyber threats.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for connected vehicle cybersecurity. The method comprises: creating a normal behavior model based on a first set of data, the first set of data including at least one first event with respect to at least one connected vehicle, wherein the first set of data is collected from a plurality of data sources; detecting an anomaly based on the normal behavior model and a second set of data, the second set of data including a second event with respect to the at least one connected vehicle, wherein each of the first set of data and the second set of data includes vehicle data related to operation of the at least one connected vehicle, wherein each event represents a communication with the at least one connected vehicle; determining, based on the detected anomaly, at least one mitigation action; and causing implementation of the at least one mitigation action.

Certain embodiments disclosed herein also include a non-transitory computer readable medium having stored thereon causing a processing circuitry to execute a process for connected vehicle cybersecurity, the process comprising: creating a normal behavior model based on a first set of data, the first set of data including at least one first event with respect to at least one connected vehicle, wherein the first set of data is collected from a plurality of data sources; detecting an anomaly based on the normal behavior model and a second set of data, the second set of data including a second event with respect to the at least one connected vehicle, wherein each of the first set of data and the second set of data includes vehicle data related to operation of the at least one connected vehicle, wherein each event represents a communication with the at least one connected vehicle; determining, based on the detected anomaly, at least one mitigation action; and causing implementation of the at least one mitigation action.

Certain embodiments disclosed herein also include a system for connected vehicle cybersecurity. The system comprises: a processing circuitry; and a memory, the memory containing instructions that, when executed by the processing circuitry, configure the system to: create a normal behavior model based on a first set of data, the first set of data including at least one first event with respect to at least one connected vehicle, wherein the first set of data is collected from a plurality of data sources; detect an anomaly based on the normal behavior model and a second set of data, the second set of data including a second event with respect to the at least one connected vehicle, wherein each of the first set of data and the second set of data includes vehicle data related to operation of the at least one connected vehicle, wherein each event represents a communication with the at least one connected vehicle; determine, based on the detected anomaly, at least one mitigation action; and cause implementation of the at least one mitigation action.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
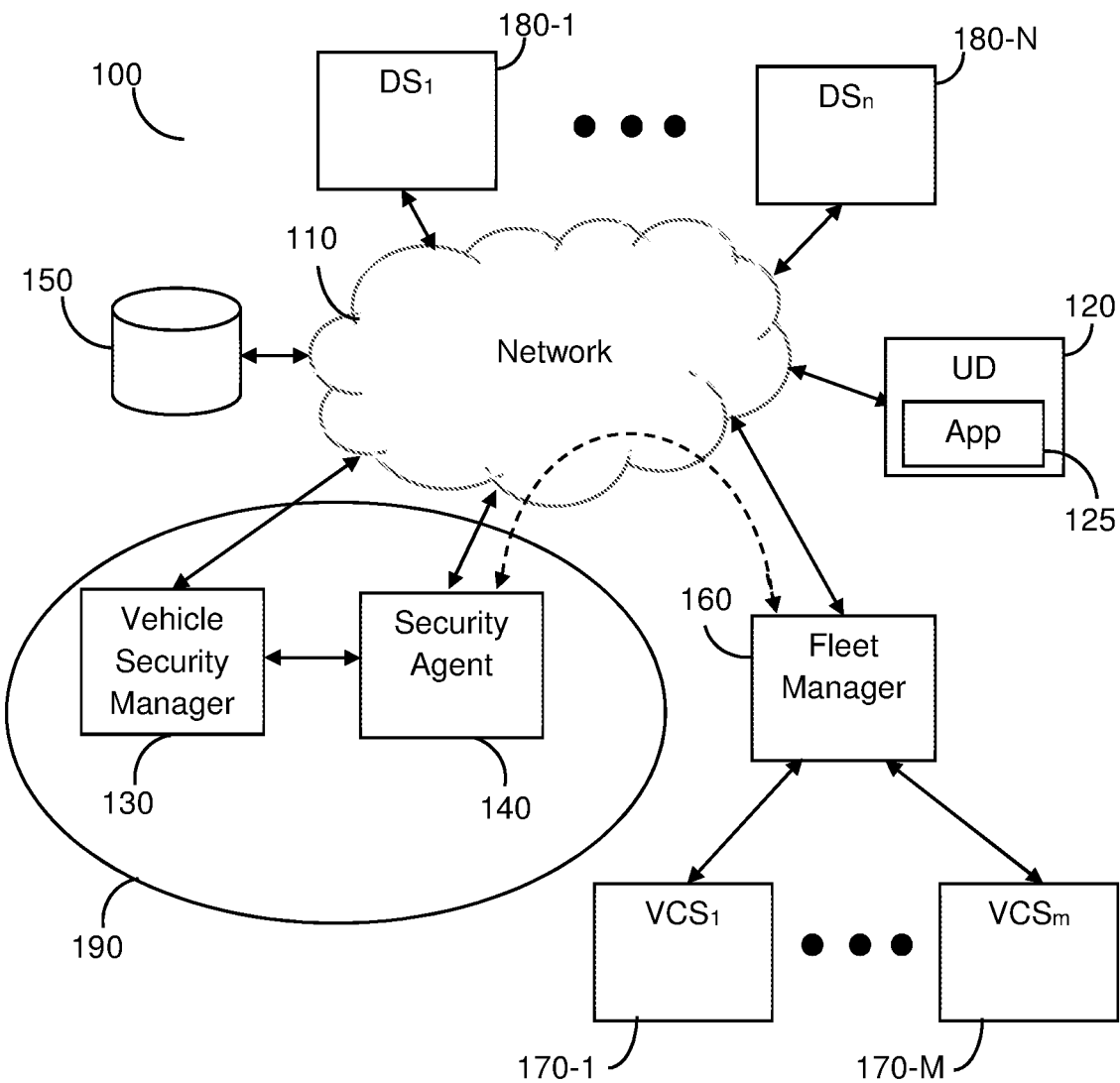
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for securing connected vehicles and connected vehicle services against cyber-attacks. Thus, the disclosed embodiments provide connected vehicle cybersecurity techniques. Vehicle data from multiple data sources is collected and correlated to monitor vehicle or vehicle service behavior over time and to detect changes in vehicle or vehicle service behavior representing anomalies. The vehicle data includes data related to operation of the vehicle such as, but not limited to, internal data (e.g., engine speed, engine state, etc.), functional data (e.g., vehicle location, speed, etc.), driver data, user data (e.g., when the connected vehicle is controlled remotely), applicative service data (e.g., commands sent to the connected vehicle by a server or user device as part of a connected vehicle service), and the like. The vehicle data indicates information related to behavior of the vehicle such that abnormal vehicle data may represent anomalous behavior that requires mitigation.

The detection is further based on a normal behavior model created based on individual vehicle behavior, fleet behavior, sub-fleet behavior, service behavior, or a combination thereof. The normal behavior model may be created by analyzing sources of data such as, but not limited to, telematics data (e.g., from multiple sensors inside a car), communication protocols (e.g., car sharing protocols, fleet management protocols, original equipment manufacturer connected car protocols, etc.), driver or user mobile applications (e.g., communication protocols used to communicate between a mobile device and a server such as the OnStar® app by General Motors®), and the like. The analysis may include machine learning of normal vehicle behavior data. A root cause of the anomaly may be determined. One or more mitigation actions for mitigating the anomaly are taken.

The embodiments disclosed herein allow for real-time detection of vehicle behavior anomalies and, therefore, can be utilized to mitigate cyber-attacks directed to individual connected vehicles, fleets of connected vehicles, or connected vehicle services in real-time. The connected vehicle services may be provided using, for example, a telematics server configured to collect telematics from the connected vehicles. Thus, various disclosed embodiments may be utilized to protect such a telematics server from cyber-attacks conducted through connected vehicles. Further, the disclosed embodiments allow for incorporating data from various data sources to create and update normal behavior models dynamically, thereby resulting in more accurate anomaly detection than using static models.

Moreover, the disclosed embodiments provide more efficient and secure detection of anomalous behavior than, for example, analyzing commands received by a vehicle control system. In particular, based on the normal behavior models, cyber threats may be detected in real-time as they occur, thereby allowing for early adapting to cyber threats before they spread to other vehicles in a fleet or other vehicles interacting with the same service. A connected vehicle service may include, but is not limited to, one or more servers, user devices, or both, configured to interact with connected vehicles for purposes such as, for example, sending commands, receiving telematics and other data, and the like. For example, based on data collected by sensors inside a car, telematics data correlated among thousands of cars, or a combination of multiple types of data, malware running on a specific set of the cars may be detected before it spreads to the other cars.

FIG. 1 is an example network diagram 100 utilized to describe the various disclosed embodiments. The network diagram 100 includes a user device (UD) 120, a vehicle security manager 130, a security agent 140, a database 150, a fleet manager 160, vehicle control systems (VCSs) 170-1 through 170-M (hereinafter referred to individually as a vehicle control system 170 and collectively as vehicle control systems 170, merely for simplicity purposes), and data sources (DSs) 180-1 through 180-N (hereinafter referred to individually as a data source 180 and collectively as data sources 180, merely for simplicity purposes) communicatively connected via a network 110. The network 110 may be, but is not limited to, the Internet, the world-wide-web (WWW), a wide area network (WAN), a metro area network (MAN), and other networks capable of enabling communication between the elements of the network diagram 100.

The user device 120 may be, but is not limited to, a personal computer (PC), a personal digital assistant (PDA), a mobile phone, a smart phone, a tablet computer, a wearable computing device and other kinds of wired and mobile appliances, equipped with communication capabilities that are enabled as further discussed herein below. The user device 120 may have installed thereon an application 125. The application 125 may be configured to receive inputs indicating commands to be executed by the fleet manager 160 or by one or more of the vehicle control systems 170, and to send the commands to the vehicle security manager 130 via the security agent 140.

The security agent 140 is a network element configured to enable communications with the vehicle security manager 130 via the network 110. The security agent 140 is further configured to receive data from multiple sources including, but not limited to, requests from the user device 120 (e.g., via the app 125), vehicle sensor data, and telematics data, and to detect anomalies based on the received data. The requests may indicate commands that are to be sent to and implemented by the fleet manager 160, by one or more of the vehicle control systems 170, or both. As a non-limiting example, such a command may be "Start_Engine" that was sent to the vehicle control system 170.

Anomalies may be detected based on, but not limited to, receiving a request for a command to be implemented by the fleet manager 160 or one of the vehicle control systems 170

(e.g., a command to lock or unlock a connected vehicle, to turn the connected vehicle on or off, to control driving of the connected vehicle, etc.), an attempt to access data from the fleet manager 160 or the vehicle control system 170, and the like. The security agent 140 is configured to send the detected anomalies to the vehicle security manager 130 for analysis.

The security agent 140 may be further configured to identify a driver of a connected vehicle including or otherwise controlled by the vehicle control system 170 from which a request is received. Based on the requests, the identified driver, the anomalies, commands sent by the vehicle security manager 130, or a combination thereof, the security agent 140 may be configured to update a state of the connected vehicle. The state may indicate a context utilized to determine expected anomalies and commands as described further herein below, and may be, but is not limited to, an allocation of a vehicle to a specific driver, a most recent over-the-air number received by the vehicle, and the like.

In an embodiment, the security agent 140 and the vehicle security manager 130 are deployed in a datacenter 190. Accordingly, the connected vehicles controlled by the vehicle control systems 170 may be secured from the datacenter 190. Alternatively, the security agent 140 and the vehicle security manager 130 may be deployed in a cloud computing platform (not shown) such as a public cloud, a private cloud, or a hybrid cloud. In another implementation, the security agent 140 may be deployed in fleet, or on premises of the fleet manager 160.

Each of the vehicle control systems 170 is deployed with respect to a connected vehicle (not shown) and may be configured to control at least partially automated vehicle actions, to collect data from the respective connected vehicle, or both. A connected vehicle is configured to receive and send data (e.g., over the network 110), and may be further configured to implement commands in the received data (for example, a "Start_Engine" command). To this end, a connected vehicle includes computer components such as, but not limited to, a processing circuitry, a memory, a network interface, and the like. A connected vehicle may be, but is not limited to, a car, a bus, a truck, and the like. The connected vehicles may be at least partially controlled remotely.

The fleet manager 160 is configured to manage processes and tasks related to a fleet of connected vehicles (not shown) and may further be configured to at least partially control driving of the connected vehicles via the respective vehicle control systems 170. To this end, the fleet manager 160 may be an application server or a control server. The application server may include logic of an application program for managing individual controlled vehicles or fleets of controlled vehicles such as, but not limited to, the Local Motion fleet management app by Zipcar®, the UberFLEET app by Uber, and the like. The fleet manager 160 may be communicatively connected to the vehicle control systems 170 via one or more networks (not shown) such as the Internet, a local area network (LAN), and the like.

Figure 2:
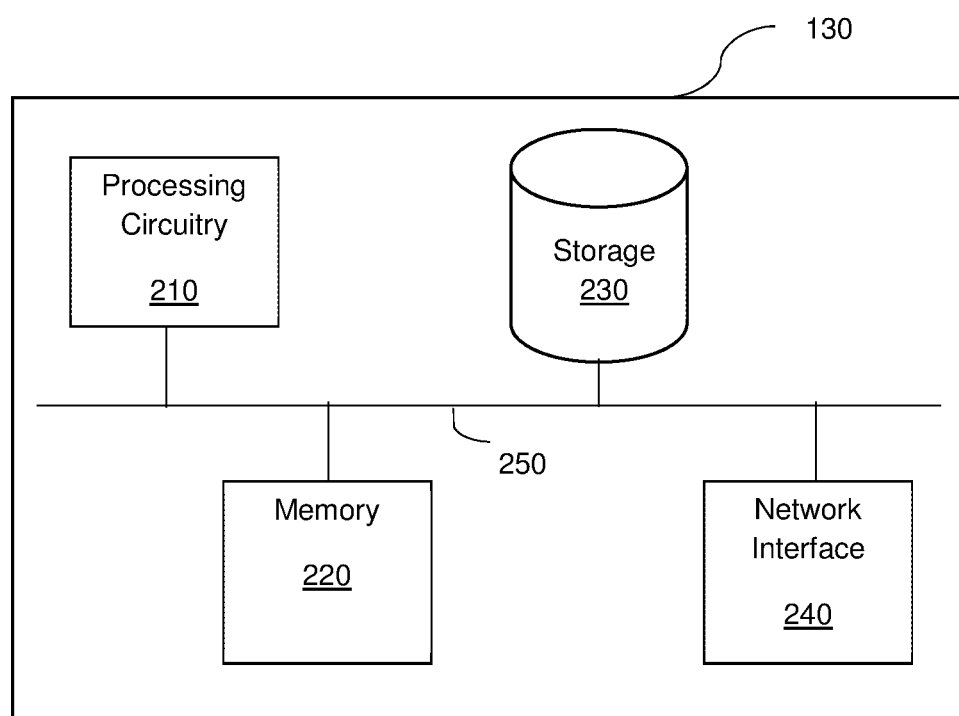
FIG. 2 is a block diagram of a vehicle security manager according to an embodiment.

In an embodiment, the vehicle security manager 130 includes a processing circuitry coupled to a memory (e.g., the processing circuitry 210 and the memory 220 as shown in FIG. 2). The memory contains instructions that can be executed by the processing circuitry. The instructions, when executed by the processing circuitry, configure the vehicle security manager 130 to secure connected vehicles, connected vehicle services, or both against cyber-attacks by detecting anomalous behavior and causing mitigation actions as described herein.

In an embodiment, the vehicle security manager 130 is configured to collect vehicle data from the data sources 170, the fleet manager 160, and the security agent 140. To this end, the data sources 170 store vehicle data such as, but not limited to, events, vehicle states, data traffic, telemetry data (e.g., Controller Area Network messages, sensor readings collected by sensors of a car, etc.), over-the-air (OTA) updates, log analytics, Lidar data, radar data, images, videos, and the like. The data stored in the data sources 170 may be from fleet managers, vehicle control systems, traffic control systems, and other systems configured to monitor and collect data related to vehicle or fleet behavior. Specifically, data from multiple different sources of information may be collected and utilized to detect anomalies, determine root causes, and the like. The vehicle security manager 130 may be configured to normalize the collected vehicle data.

Based on the vehicle data, the vehicle security manager 130 may be configured to determine at least one vehicle data abstraction. Each vehicle data abstraction is a representation of a portion of the vehicle data including only data utilized for anomaly detection. As non-limiting examples, abstractions for vehicle data may include, but are not limited to, time, direction (e.g., vehicle to server or server to vehicle), client identifier (ID), driver ID, application, server ID, request type, server response status, violation type, violation name, OTA update ID, OTA update name, OTA update distribution time, client distribution time, vehicle location, speed, gear position, odometer value, acceleration, engine speed, engine state, wheel position, telematics, server commands, vehicle message identifier, and the like. Abstracting the vehicle data allows for more efficient processing and anomaly detection.

The vehicle security manager 130 is configured to cluster the abstracted data. Based on the clustered data, the vehicle security manager 130 is configured to create models of normal behavior. Each model may be created via supervised or unsupervised machine learning using the collected vehicle data as inputs. The models may be created per vehicle, per sub-fleet of vehicles (i.e., per a group of vehicles among a fleet), fleet of vehicles, for all monitored vehicles (e.g., all fleets of vehicles), for a connected vehicle service interacting with the vehicles, or a combination thereof. Each sub-fleet is a grouping of vehicles among a fleet, and may include, e.g., all vehicles matching a common condition. For example, a sub-fleet may include vehicles at or near a geographical location (e.g., within 100 miles of the geographical location), vehicles connected to the same local area network, vehicles of a specific make or model, vehicles of a specific year, vehicles adhering to a predefined condition, a combination thereof, and the like.

Sub-fleets may be permanent sub-fleets that are predetermined, or may be created ad-hoc, for example as vehicles move from one location to another. Ad-hoc creation of sub-fleets allows for dynamic grouping of vehicles that are more likely to exhibit similar behavior or deviations from behavior, thereby allowing for more accurate anomaly detection. Further, the models do not need to be mutually exclusive. For example, a model for multiple groups that are overlapping may be created.

In an embodiment, models may be created with respect to different levels of a hierarchy of vehicles within a fleet (e.g., the entire fleet, one or more sub-fleets, further subdivisions of the fleet, one or more individual vehicles, etc.). Modeling vehicle behavior at different hierarchical levels allows for more accurate anomaly detection and classification, and may further allow for root cause determination for anomalies. As a non-limiting example, anomalies detected for multiple vehicles of a sub-fleet that are connected to the same local area network may indicate a cyber-attack affecting vehicle control systems connected to that local area network.

Using the normal behavior models and the events received from the security agent 140, the vehicle security manager 130 is configured to detect, in real-time, behavioral anomalies. The detected anomalies may include anomalies in individual vehicle behavior, in behavior of groupings of vehicles (e.g., a fleet or sub-fleet), or in behavior of a vehicle service interacting with vehicles (e.g., abnormal behavior by one or more servers or other systems used to provide the service). The vehicle security manager 130 is configured to cluster the detected anomalies and to correlate the clusters to determine a root cause of the anomalies. The determined root cause may include cyber threats such as, but is not limited to, cyber-attacks, privacy leakage (e.g., data leakage), fraud (e.g., car misuse, driver or vehicle identity theft, etc.), a combination thereof, and the like. The correlation may further be among clusters generated for different levels of a hierarchy of a fleet, thereby allowing for identification of a particular sub-fleet and correlation indicating the root cause of the anomalies.

In another embodiment, the vehicle security manager 130 is configured to detect commonalities between the anomalies. The commonalities may be based on common features among vehicles affected by the anomalies. For example, a commonality may be detected when vehicles share a common model.

Specifically, with respect to car misuse, a normal behavior model of vehicle behaviors related to example car uses may be created. Some car uses may violate, for example, fleet car manager policies or other restrictions on car uses. For example, a fleet manager profile for a car manager company may define allowable car uses as excluding use of rented cars as taxis (e.g., being used to provide rides via ride sharing services such as Uber or Lyft). The normal behavior model may be applied to vehicle data to determine whether vehicle behavior is in accordance with taxi use patterns rather than private use patterns.

Additionally, with respect to identity theft, a normal behavior model of driver behaviors related to drivers having specific identities may be created. Typical driving behavior of each driver may be modeled such that, by applying the driver normal behavior model to vehicle data, driver behavior that is different from normal driving behavior for a particular may be detected and used to determine identity theft. For example, a driver using a stolen ZIP car credential that drives a vehicle exhibits different driving behavior than the driver associated with the ZIP car credential, and the detected different behavior is used to determine that identity theft has occurred.

When the determined root cause is a cyber threat, the vehicle security manager 130 may be configured to cause, in real-time, implementation of at least one mitigation action for mitigating the cyber threat. The vehicle security manager 130 may be configured to send instructions for implementing the mitigation actions to the fleet manager 160, to any of the vehicle control systems 170, to a server used for providing connected vehicle services (e.g., a server of a traffic control service), among the data sources 180, and the like, via the security agent 140. To this end, the vehicle security manager 130 may be configured to generate or determine a security policy defining the instructions for implementing the mitigation actions, and to send the security policy to the security agent 140. When the security policy is received by the fleet manager 160, the fleet manager 160 is configured to cause the vehicle control systems 170 to implement the mitigation actions.

As non-limiting examples, deep protocol inspection may be utilized to mitigate a cyber threat including taking control of the vehicle control system 170 (and, therefore, its respective vehicle) using a malformed crafted packet or application data. To this end, a white list may be set per user group when the user device 120 sends a request for a forbidden command, a profile or policy limitation may be implemented when the user device sends a request for a rogue command that is not forbidden (e.g., as determined based on detection of abnormal behavior), driver identity theft may be identified and blocked per the corresponding network identity, vehicle identity theft may be identified and blocked per the corresponding network identity, resources for multiple customers (e.g., multiple fleets or individual vehicles) may be pooled when a DDoS attack is performed, and the like.

The context is a persistent state of a vehicle that is utilized to determine whether a requested command is expected, to determine an expected subsequent anomaly, a root cause of unexpected behavior, combinations thereof, and the like. The context is created by contextually enhancing a vehicle state using data ingested from multiple sources. Accordingly, the context provides information that is not explicitly indicated in the ingested data but may be useful for determining causes and effects of anomalies. For example, the context may be that a vehicle is deallocated from a driver such that a request for a start engine command while the vehicle is not allocated to a driver is unexpected and, therefore, may indicate misuse. As another example, a context for a group of vehicles may indicate that an OTA update was sent to each of the vehicles such that, if fleet behavior for the group of vehicles is abnormal (e.g., as determined by applying a machine learning model to vehicle data of the group of vehicles), the OTA update may be determined as a potential root cause of the abnormal behavior.

Figure 4:
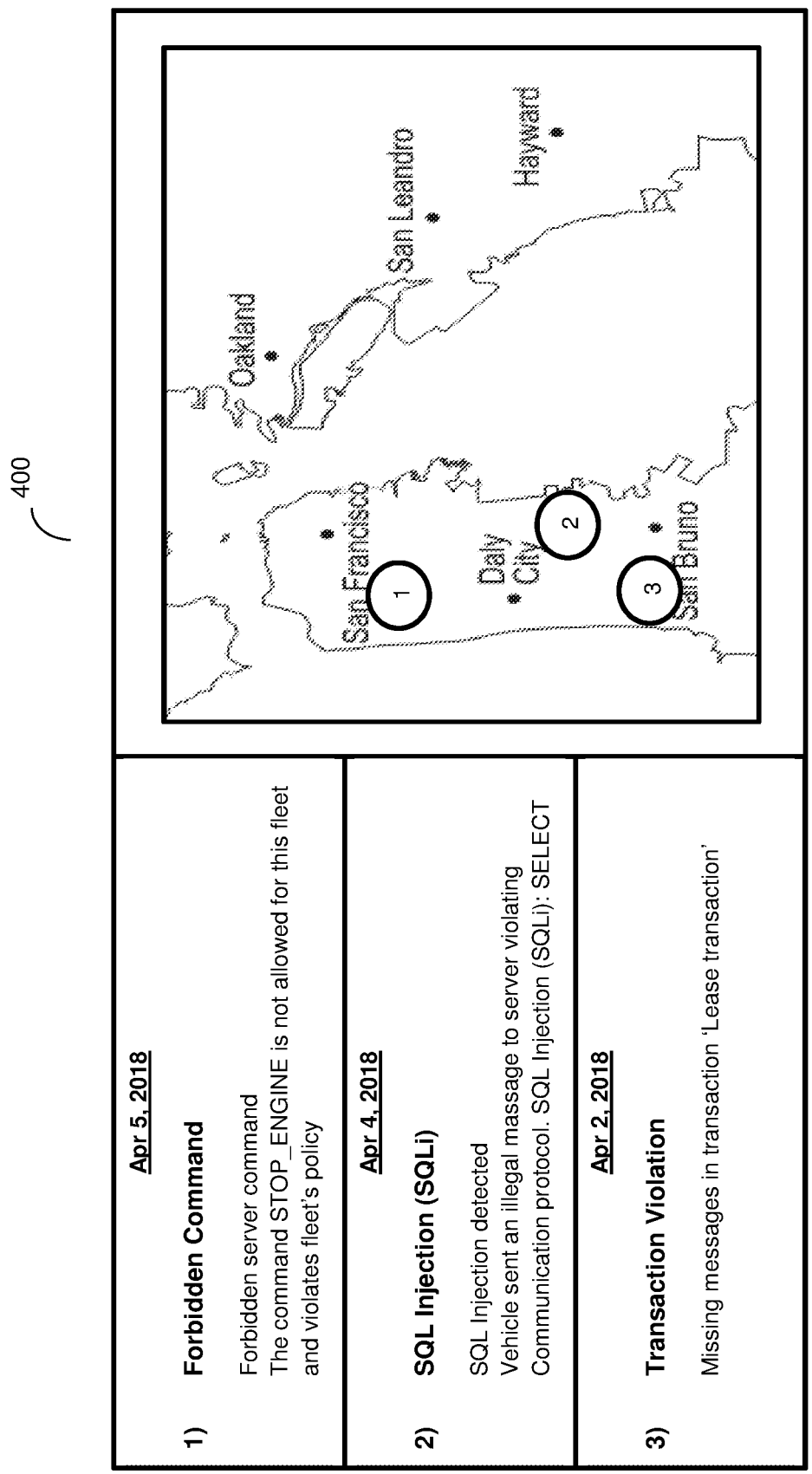
FIG. 4 is an example screenshot of a fleet manager dashboard.

The vehicle security manager 130 be further configured to generate a dashboard indicating cyber threats, anomalies, both, and the like. An example dashboard 400 is shown in FIG. 4. The example dashboard 400 illustrates cyber-attack information and trends for a fleet of connected cars.

It should be noted that only one fleet manager 160 and one set of vehicle control systems 170 are described herein with respect to FIG. 1 merely for simplicity purposes and without limitation on the disclosed embodiments. Multiple fleet managers, groups of vehicle control systems, individual vehicle control systems, or combinations thereof, may be secured in accordance with the disclosed embodiments. For example, multiple fleet managers, a fleet manager and one or more individual vehicles, and the like, may be secured without departing from the scope of the disclosed embodiments.

It should be further noted that only one user device 120 and one application 125 are described herein above with reference to FIG. 1 merely for the sake of simplicity and without limitation on the disclosed embodiments. Multiple user devices may provide requests for commands to be executed by the vehicles control systems 170 without departing from the scope of the disclosure. Further, requests may be received from servers or other systems without departing from the scope of the disclosure.

It should also be noted that various embodiments are described with respect to a fleet manager 160 merely for example purposes and without limitation on the disclosed embodiments. Instructions for implementing the mitigation actions may be sent to, for example, a workflow manager, an events collector or analyzer, and the like. An example network diagram illustrating an implementation without a fleet manager is described further herein below with respect to FIG. 5.

FIG. 2 is an example schematic diagram of a vehicle security manager 130 according to an embodiment. The vehicle security manager 130 includes a processing circuitry 210 coupled to a memory 220, a storage 230, and a network interface 240. In an embodiment, the components of the vehicle security manager 130 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 210 to perform the various processes described herein. Specifically, the instructions, when executed, cause the processing circuitry 210 to secure connected vehicles from cyber-attacks as described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the vehicle security manager 130 to communicate with the security agent 140 for the purpose of, for example, receiving events, sending commands to be implemented by the fleet manager 160 or the VCSs 170, and the like. Further, the network interface 240 allows the vehicle security manager 130 to communicate with the data sources 180 for the purpose of collecting vehicle data.

It should be understood that the embodiments described herein are not limited to the specific architecture illustrated in FIG. 2, and other architectures may be equally used without departing from the scope of the disclosed embodiments.

Figure 3:
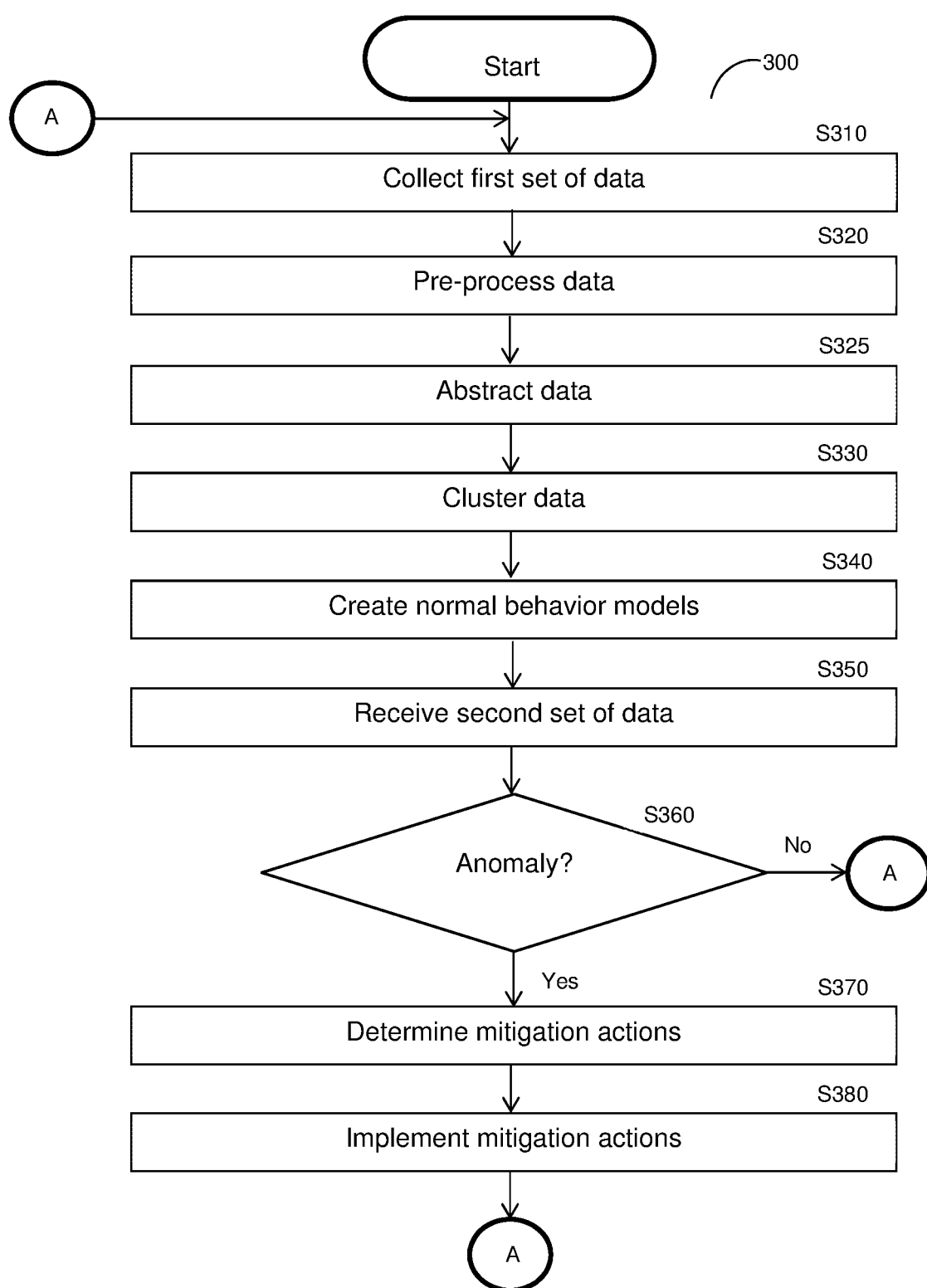
FIG. 3 is a flowchart of a method for securing computerized vehicle control systems according to an embodiment.

FIG. 3 is an example flowchart 300 illustrating a method for connected vehicle cybersecurity according to an embodiment. In an embodiment, the method may be performed by the vehicle security manager 130.

At S310, a first set of data is collected from a plurality of data sources. The first set of data includes vehicle data related to operation of the connected vehicle and, specifically, may include events generated by a security agent based on requests received from user devices. The first set of data may further include, for example, data traffic, telematics, vehicle sensor data, over-the-air (OTA) updates, log analytics, Lidar data, radar data, images, videos, and the like. At least a portion of the vehicle data may be received as messages.

At optional S320, the first set of data may be pre-processed. The pre-processing may include, but is not limited to, normalization of the data. At optional S325, the first set of data may be abstracted as described herein above.

At S330, the first set of data is clustered. The clustering includes correlating the vehicle data. The clustering may be with respect to types of data, levels in a hierarchy of connected vehicles, or both.

In an embodiment, S330 may further include updating a vehicle context of each vehicle for which data was collected. To this end, S330 may include matching portions of the data to known vehicles and updating the context of all vehicles matched to portions of the data. If a match is not found, a new context may be created for the vehicle. The context may be indicated as a contextually enhanced vehicle state including internal, functional, applicative, and driver states.

At S340, one or more normal behavior models is created based on the clustered vehicle data. The normal behavior models define a normal behavior per individual vehicle, per fleet, per sub-fleet, for all vehicles, for a connected vehicle service, or a combination thereof. The normal behavior models may be continuously updated as new vehicle data is received, thereby dynamically adjusting detection of anomalies. To this end, sub-fleets may be defined dynamically when, e.g., two or more monitored vehicles meets the same condition (e.g., being connected to the same network), thereby allowing for dynamic modeling based on vehicles that are likely to have similar behavior patterns.

In an embodiment, a normal behavior model may be created by training a machine learning model using the clustered vehicle data collected over time as inputs. The machine learning may be supervised or unsupervised. In a further embodiment, the machine learning may be based on pre-processed data. The pre-processing may include, but is not limited to, normalizing the data, clustering the data, enriching the data (e.g., contextually enhancing the data to create a context), and the like.

In an embodiment, creating the normal behavior model includes creating a network protocol analyzer. The network protocol analyzer is configured based on the events of the first set of data. Behavior may be anomalous when, for example, use of an unexpected network protocol is determined using the network protocol analyzer.

In an embodiment, the normal behavior model may be created based on an expected order of events. To this end, S340 may include creating one or more expected sequences of events based on multiple events of the first data set. Behavior may be anomalous when an expected sequence of events is not met.

In an embodiment, the normal behavior model is created based on internal vehicle variables related to, for example, setup, mechanical condition of parts, software version, engine control unit (ECU) data, and the like.

In an embodiment, a normal behavior model may be created at least partially based on a security policy. The security policy may be created based on predetermined security policy parameters, parameters determined based on inputs by a user, or both. To this end, the normal behavior model may be defined such that deviations from the security policy are detected as anomalies with respect to the normal behavior model.

In yet another embodiment, a normal behavior model may be created based on contexts. Each context is a contextually enhanced vehicle state as described herein above and indicates information about a vehicle that is not explicitly indicated in the clustered data. To this end, S340 may include updating or creating a context of each vehicle at different points in time for the clustered data. The normal behavior model may indicate normal contexts for vehicles with respect to historical data (e.g., messages including event data).

At S350, a second set of data including an event with respect to a connected vehicle is received. The event represents a communication with or related to the connected vehicle and may indicate an attempt to control or access data related to a connected vehicle (e.g., based on a request for a command to perform such actions), receiving data from a connected vehicle, and the like. The event may be received from a security agent as described further herein above with respect to FIG. 1. The event may be received in the form of a message generated by a security agent.

At S360, based on the second set of data and the normal behavior models, it is determined whether an anomaly is detected and, if so, execution continues with S370; otherwise, execution continues with 310. In an embodiment, S360 may include analyzing a message, a collection of messages (e.g., a sequence of messages), a message and a context, or a combination thereof. In some implementations, an anomaly may also be detected when a predetermined configuration is not met.

At S370, when an anomaly is detected, one or more mitigation actions is determined. The mitigation actions may be determined based on the anomaly, for example, based on a type of the anomaly (e.g., abnormal speed, abnormal context, abnormal location, etc.), a severity (i.e., a degree to which the anomaly deviates from normal behavior), or both. The mitigation actions may include actions for blocking one or more communications or types of communications with the anomaly-demonstrating connected vehicles (e.g., communications sent to or received from the vehicles), for ignoring one or more defined commands to those connected vehicles, for blocking one or more communications or types of communications with the anomaly-demonstrating connected vehicle service (e.g., communications sent to or received from the connected vehicle service), for causing actions via a connected vehicle service (e.g., causing a display of mitigation action options on a user device and implementing one or more of the mitigation action options when a user of the user device selects them via the user device, for activating a workflow via a workflow manager of the service, etc.), for generating an alert or report indicating the anomaly, and the like.

In an embodiment, S370 includes determining a root cause of the anomaly, where the mitigation actions are determined based on the root cause. As noted herein above, the root cause may be determined based on the anomalies, the normal behavior models, the hierarchy of connected vehicles, or a combination thereof. To this end, anomalies among vehicles in a sub-fleet having a common condition may be indicative of a root cause related to the common condition. For example, an abnormal amount of requests from user devices directed to vehicles in a particular fleet may indicate a DDoS attack directed at the fleet manager of the fleet.

At S380, the determined mitigation actions are caused to be implemented in real-time and execution continues with S310 for continued updating of the models and anomaly detection. Implementing the mitigation actions includes sending a command for executing the mitigation actions to the vehicle and may further include, but is not limited to, sending a security policy to a security agent, sending a notification to an external user device, and the like.

Figure 5:
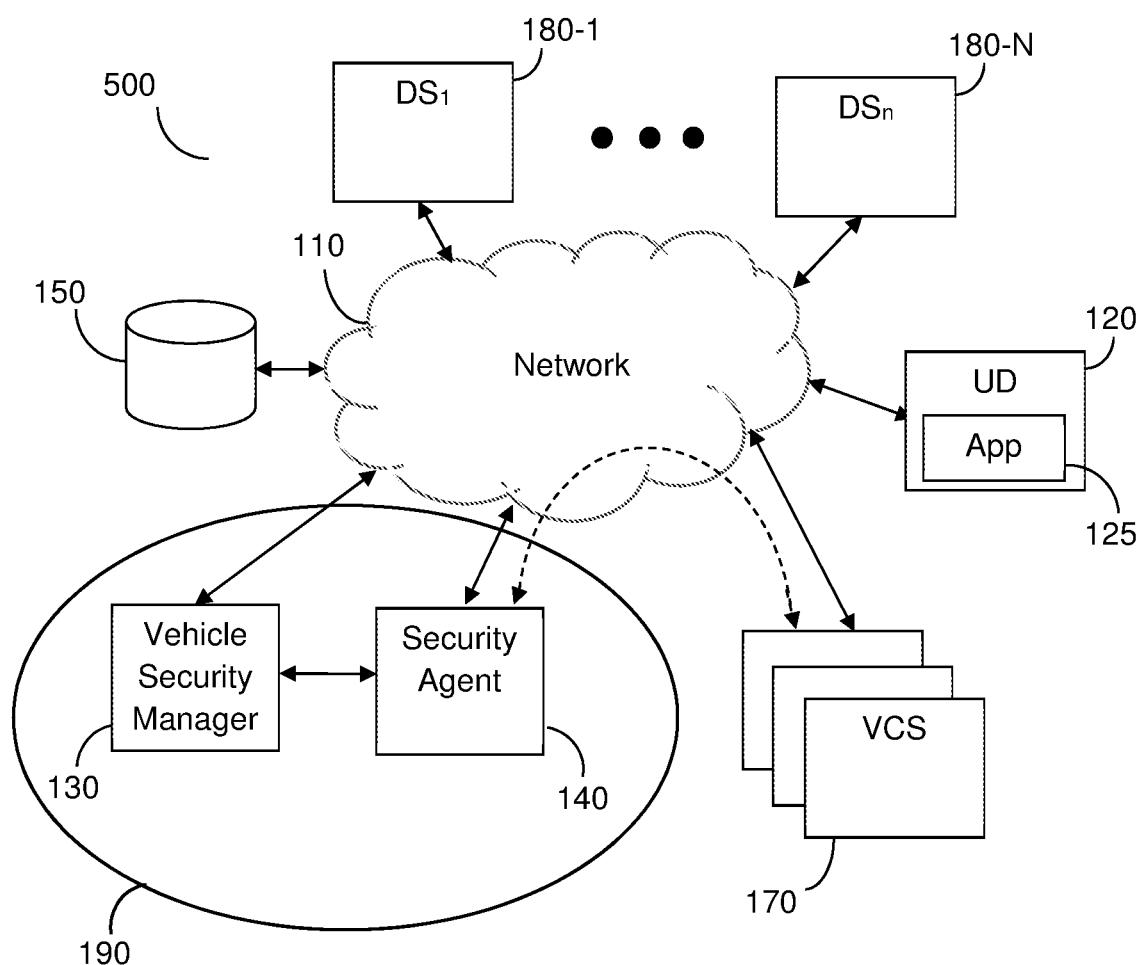
FIG. 5 is another network diagram according to an embodiment.

FIG. 5 is an example network diagram 500 illustrating communication with the vehicle control systems 170 without the fleet manager 160 according to an embodiment. In the example network diagram 500, the security agent 140 is configured to send commands from the vehicle security manager 130 to the vehicle control systems 170 via the network 110.

It should be noted that, although various embodiments are described herein with respect to cars, the embodiments described herein are not limited to cars and may be equally utilized to protect other types of network-connected vehicles from cyber threats without departing from the scope of the disclosure. It should be further noted that a connected vehicle may include any vehicle communicating with or communicatively connected to other systems, either directly or over one or more networks, that may be susceptible to being harmed by or facilitating cyber threats.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for connected vehicle cybersecurity, comprising:
    creating, by a remote system, a normal behavior model for a fleet of connected vehicles based on a first set of data, the first set of data including at least one first event with respect to the fleet of connected vehicles, wherein the first set of data is collected from at least one data source, wherein the remote system is remote from the fleet of connected vehicles;
    creating an individual normal behavior model for each connected vehicle of the fleet of connected vehicles based on the first set of data;
    detecting, by the remote system, an anomaly based on the normal behavior model and a second set of data, wherein the anomaly indicates a cyber threat, the second set of data including a second event with respect to the fleet of connected vehicles, wherein each of the first set of data and the second set of data includes vehicle data related to operation of the fleet of connected vehicles, wherein each event represents a communication with at least one vehicle of the fleet of connected vehicles, wherein the anomaly is detected based further on the individual normal behavior models, wherein the detected anomaly includes a deviation from a first individual normal behavior model of the at least one individual normal behavior model, wherein the at least one mitigation action is implemented with respect to one of the fleet of connected vehicles associated with the first individual normal behavior model;
    determining, based on the detected anomaly, at least one mitigation action; and
    causing implementation of the at least one mitigation action.

2. The method of claim 1, further comprising:
    training a machine learning model to create the normal behavior model, wherein the first set of data is used as a training data set, and wherein features used for training the machine learning model include the at least one first event.

3. The method of claim 1, further comprising:
    contextually enriching the first set of data and the second set of data.

4. The method of claim 3, wherein each contextually enriched set of data includes a plurality of contexts, wherein each context of the plurality of contexts is a persistent vehicle state at a point in time, wherein the vehicle data indicates information related to behavior of the vehicle, wherein at least one context of the plurality of contexts provides information other than information explicitly indicated in the vehicle data.

5. The method of claim 4, wherein the anomaly is detected based further on at least one context of the second set of data.

6. The method of claim 1, wherein creating the normal behavior model further comprises:
    creating a network protocol analyzer based on the first set of data, wherein the network protocol analyzer is configured to identify use of unexpected network protocols based on the at least one first event.

7. The method of claim 1, wherein each of the at least one first event and the at least one second event is a plurality of events, wherein each event is attributed to a point in time, wherein creating the normal behavior model further comprises:
    creating at least one expected sequence of events based on the plurality of first events.

8. The method of claim 1, wherein each of the first set of data and the second set of data include internal vehicle variables, wherein the normal behavior model is created based further on the internal vehicle variables of the first set of data.

9. The method of claim 1, wherein the normal behavior model includes at least one security policy, wherein an anomaly is detected when the at least one security policy is violated.

10. The method of claim 1, wherein determining the at least one mitigation action further comprises:
    determining a root cause of the anomaly, wherein the at least one mitigation action is determined based on the root cause.

11. The method of claim 1, further comprising:
    determining at least a portion of the second set of data to be utilized for anomaly detection, wherein the anomaly is detected based only on the normal behavior model and the determined at least a portion of the second set of data.

12. The method of claim 1, wherein the fleet of connected vehicles is organized in a hierarchy, the hierarchy including a plurality of levels, wherein the normal behavior model is created for at least one of the plurality of connected vehicles that belongs to one of the plurality of levels, further comprising:
    clustering the first set of data with respect to the plurality of levels of the hierarchy, wherein the normal behavior model is created based on the clustered first set of data.

13. The method of claim 12, wherein the hierarchy includes at least one sub-fleet of the plurality of connected vehicles, further comprising:
    creating a sub-fleet normal behavior model for each sub-fleet, wherein the anomaly is detected based further on the sub-fleet normal behavior models.

14. The method of claim 13, wherein the detected anomaly includes a deviation from a first sub-fleet normal behavior model of the at least one sub-fleet normal behavior model, wherein the at least one mitigation action is implemented with respect to each connected vehicle included in a sub-fleet associated with the first sub-fleet normal behavior model.

15. The method of claim 1, wherein each of the first set of data and the second set of data includes at least one of: telematics data, communication protocols, connected vehicle service data, driver mobile applications, and user mobile applications.

16. The method of claim 1, wherein the at least one mitigation action includes at least one of: blocking at least one communication with the fleet of connected vehicles, blocking at least one communication with at least one connected vehicle service, generating an alert or report indicating the anomaly, and ignoring at least one command to be sent to the at least one connected vehicle of the fleet of connected vehicles.

17. The method of claim 1, wherein the at least one mitigation action includes causing at least one action via a connected vehicle service, wherein the connected vehicle service includes at least one of: at least one user device, and at least one server.

18. A non-transitory computer readable medium having stored thereon instructions for causing a processing circuitry to execute a process for connected vehicle cybersecurity, the process comprising:
creating, by a remote system, a normal behavior model for a fleet of connected vehicles based on a first set of data, the first set of data including at least one first event with respect to the fleet of connected vehicles, wherein the first set of data is collected from at least one data source, wherein the remote system is remote from the fleet of connected vehicles;
creating an individual normal behavior model for each connected vehicle of the fleet of connected vehicles based on the first set of data;
detecting, by the remote system, an anomaly based on the normal behavior model and a second set of data, wherein the anomaly indicates a cyber threat, the second set of data including a second event with respect to the fleet of connected vehicles, wherein each of the first set of data and the second set of data includes vehicle data related to operation of the fleet of connected vehicles, wherein each event represents a communication with at least one vehicle of the fleet of connected vehicles, wherein the anomaly is detected based further on the individual normal behavior models, wherein the detected anomaly includes a deviation from a first individual normal behavior model of the at least one individual normal behavior model, wherein the at least one mitigation action is implemented with respect to one of the fleet of connected vehicles associated with the first individual normal behavior model;
determining, based on the detected anomaly, at least one mitigation action; and
causing implementation of the at least one mitigation action.

19. A system for connected vehicle cybersecurity, comprising:
a processing circuitry; and
a memory, the memory containing instructions that, when executed by the processing circuitry, configure the system to:
create, by a remote system, a normal behavior model for a fleet of connected vehicles based on a first set of data, the first set of data including at least one first event with respect to the fleet of connected vehicles, wherein the first set of data is collected from at least one data source, wherein the remote system is remote from the fleet of connected vehicles;
create an individual normal behavior model for each connected vehicle of the fleet of connected vehicles based on the first set of data;
detect, by the remote system, an anomaly based on the normal behavior model and a second set of data, wherein the anomaly indicates a cyber threat, the second set of data including a second event with respect to the fleet of connected vehicles, wherein each of the first set of data and the second set of data includes vehicle data related to operation of the fleet of connected vehicles, wherein each event represents a communication with at least one vehicle of the fleet of connected vehicles, wherein the anomaly is detected based further on the individual normal behavior models, wherein the detected anomaly includes a deviation from a first individual normal behavior model of the at least one individual normal behavior model, wherein the at least one mitigation action is implemented with respect to one of the fleet of connected vehicles associated with the first individual normal behavior model;
determine, based on the detected anomaly, at least one mitigation action; and
cause implementation of the at least one mitigation action.

20. The system of claim 19, wherein the system is further configured to:
train a machine learning model to create the normal behavior model, wherein the first set of data is used as a training data set, and wherein features used for training the machine learning model include the at least one first event.

21. The system of claim 19, wherein the system is further configured to:
contextually enrich the first set of data and the second set of data.

22. The system of claim 21, wherein each contextually enriched set of data includes a plurality of contexts, wherein each context of the plurality of contexts is a persistent vehicle state at a point in time, wherein the vehicle data indicates information related to behavior of the vehicle, wherein at least one context of the plurality of contexts provides information other than information explicitly indicated in the vehicle data.

23. The system of claim 22, wherein the anomaly is detected based further on at least one context of the second set of data.

24. The system of claim 19, wherein the system is further configured to:
create a network protocol analyzer based on the first set of data, wherein the network protocol analyzer is configured to identify use of unexpected network protocols based on the at least one first event.

25. The system of claim 19, wherein each of the at least one first event and the at least one second event is a plurality of events, wherein each event is attributed to a point in time, wherein the system is further configured to:
create at least one expected sequence of events based on the plurality of first events.

26. The system of claim 19, wherein each of the first set of data and the second set of data include internal vehicle variables, wherein the normal behavior model is created based further on the internal vehicle variables of the first set of data.

27. The system of claim 19, wherein the normal behavior model includes at least one security policy, wherein an anomaly is detected when the at least one security policy is violated.

28. The system of claim 19, wherein the system is further configured to:
determine a root cause of the anomaly, wherein the at least one mitigation action is determined based on the root cause.

29. The system of claim 19, wherein the system is further configured to:
determine at least a portion of the second set of data to be utilized for anomaly detection, wherein the anomaly is detected based only on the normal behavior model and the determined at least a portion of the second set of data.

30. The system of claim 19, further comprising:
clustering the first set of data with respect to the plurality of levels of the hierarchy, wherein the normal behavior model is created based on the clustered first set of data.

31. The system of claim 30, wherein the hierarchy includes at least one sub-fleet of the plurality of connected vehicles, wherein the system is further configured to:
create a sub-fleet normal behavior model for each sub-fleet, wherein the anomaly is detected based further on the sub-fleet normal behavior models.

32. The system of claim 31, wherein the detected anomaly includes a deviation from a first sub-fleet normal behavior model of the at least one sub-fleet normal behavior model, wherein the at least one mitigation action is implemented with respect to each connected vehicle included in a sub-fleet associated with the first sub-fleet normal behavior model.

33. The system of claim 19, wherein each of the first set of data and the second set of data includes at least one of: telematics data, communication protocols, connected vehicle service data, driver mobile applications, and user mobile applications.

34. The system of claim 19, wherein the at least one mitigation action includes at least one of: blocking at least one communication with the fleet of connected vehicles, blocking at least one communication with at least one connected vehicle service, generating an alert or report indicating the anomaly, and ignoring at least one command to be sent to the fleet of connected vehicles.

35. The system of claim 19, wherein the at least one mitigation action includes causing a display, on a user device, of at least one mitigation action option, wherein the at least one mitigation action further includes a mitigation action option selected via the user device.

* * * * *